(12) United States Patent
Raper

(10) Patent No.: US 8,793,760 B2
(45) Date of Patent: Jul. 29, 2014

(54) AUTHENTICATING ONLINE USERS WITH DISTORTED CHALLENGES BASED ON TRANSACTION HISTORIES

(75) Inventor: Kevin M. Raper, Austin, TX (US)

(73) Assignee: eBay Inc., San Jose, CA (US)

( * ) Notice: Subject to any disclaimer, the term of this patent is extended or adjusted under 35 U.S.C. 154(b) by 210 days.

(21) Appl. No.: 13/077,535

(22) Filed: Mar. 31, 2011

(65) Prior Publication Data

US 2012/0254940 A1 Oct. 4, 2012

(51) Int. Cl.
*H04L 29/06* (2006.01)
*G06Q 20/40* (2012.01)
*G06F 21/31* (2013.01)

(52) U.S. Cl.
CPC ............ *G06Q 20/4014* (2013.01); *G06F 21/31* (2013.01); *G06F 2221/2133* (2013.01)
USPC .......................................................... 726/3

(58) Field of Classification Search
CPC ................ G06Q 20/4014; G06F 21/31; G06F 2221/2133
USPC ........................................................... 726/3
See application file for complete search history.

(56) References Cited

U.S. PATENT DOCUMENTS

| | | | | |
|---|---|---|---|---|
| 7,908,223 | B2* | 3/2011 | Klein et al. | 705/75 |
| 2006/0287963 | A1* | 12/2006 | Steeves et al. | 705/64 |
| 2007/0005500 | A1* | 1/2007 | Steeves et al. | 705/51 |
| 2007/0043681 | A1* | 2/2007 | Morgan et al. | 705/67 |
| 2008/0072293 | A1* | 3/2008 | D'Urso | 726/4 |
| 2008/0209223 | A1* | 8/2008 | Nandy et al. | 713/185 |
| 2009/0234760 | A1* | 9/2009 | Walter | 705/30 |
| 2010/0037319 | A1* | 2/2010 | Steeves et al. | 726/23 |
| 2010/0229223 | A1* | 9/2010 | Shepard et al. | 726/5 |
| 2011/0055585 | A1* | 3/2011 | Lee | 713/183 |
| 2011/0137804 | A1* | 6/2011 | Peterson | 705/77 |
| 2011/0202762 | A1* | 8/2011 | Hadad et al. | 713/164 |
| 2011/0225634 | A1* | 9/2011 | Pai | 726/6 |
| 2011/0313930 | A1* | 12/2011 | Bailey, Jr. | 705/64 |
| 2011/0320823 | A1* | 12/2011 | Saroiu et al. | 713/189 |

FOREIGN PATENT DOCUMENTS

GB 2449240 A * 11/2008 ............. G06F 21/00

* cited by examiner

*Primary Examiner* — Michael Pyzocha
(74) *Attorney, Agent, or Firm* — Haynes and Boone, LLP

(57) ABSTRACT

A method for authenticating a user by a service provider includes providing at least one network, providing at least one processor, and using the at least one network and processor to receive user identification data from the user, generate and display to the user a Captcha-like challenge based on at least one previous transaction involving and known by the user and the service provider, receive a response to the challenge from the user, and determine whether the user is authentic based on the response.

26 Claims, 3 Drawing Sheets

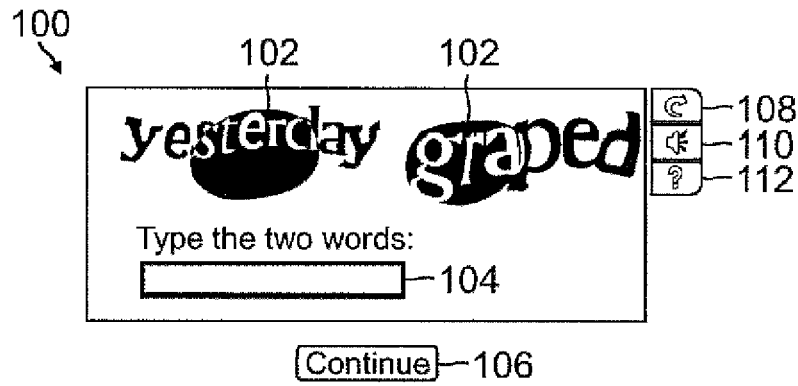
FIG. 1 - Prior Art
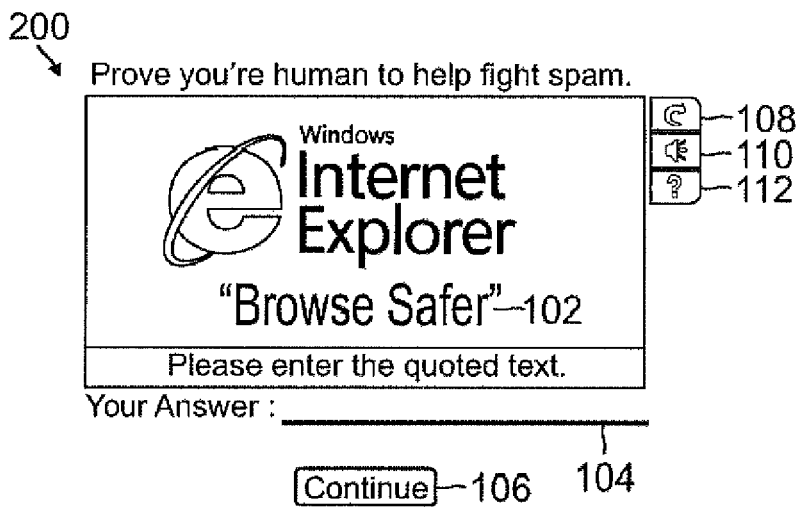
FIG. 2 - Prior Art
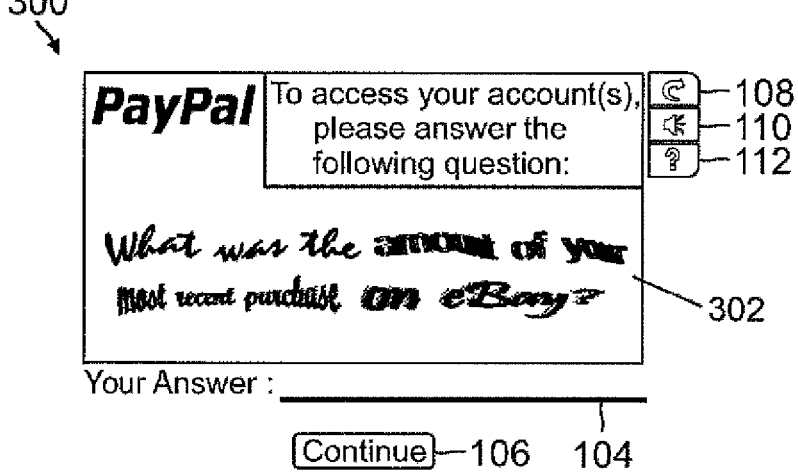
FIG. 3

AUTHENTICATING ONLINE USERS WITH DISTORTED CHALLENGES BASED ON TRANSACTION HISTORIES

BACKGROUND

1. Field of the Invention

This application relates to e-commerce in general, and more particularly, to methods and apparatus for authenticating users of a service provider over a network using Captchas that are based on unique past transactions involving both the user and the service provider.

2. Related Art

A "Captcha" is a type of challenge-and-response test used by some web sites as a means to ensure that the response to the challenge is being generated by a human and not by a computer or other automated, "robotic intelligence." Captchas are therefore sometimes described as "reverse Turing tests" because they are administered by computers to humans, and not vice-versa, and indeed, the term Captcha is an acronym for "Completely Automated Public Turing test to tell Computers and Humans Apart."

A typical Captcha requires the user to type letters, words or digits from a distorted image that is displayed to the user on a computer display, which a human can discern relatively easily, but which a computer running automated software, including artificial intelligence (AI) and optical character recognition software (OCR), cannot. For example, FIG. 1 illustrates a type of Captcha used by the United States Patent and Trademark Office (USPTO) to restrict automated, non-human access to its public Patent Application Information Retrieval (PAIR) site. Captchas are typically used to prevent automated software or robot computers from performing actions on a system which would degrade the quality of the system provided to human users due to abuses of the system or overconsumption of its resources, such as "spamming" and automated posting to blogs, forums and wikis, resulting from commercial promotion activities, harassment or vandalism.

Users of a service provider, such as a financial service provider, e.g., an online bank, such as ING Direct, or a payment/collection service, e.g., PayPal, typically access their accounts and effect financial transactions using a combination of user identity data, such as a unique user name or number, and a password or Personal Identification Number (PIN). While this technique generally provides the user with a relatively secure method of accessing his or her accounts, it does not enable the service provider to determine whether the entity accessing the system is a human or a robot computer. However, while conventional Captchas can supply the latter need, they generally lack the requisite degree of security for the former because they can easily be solved by a human interloper, e.g., one possessing the user's identification data but not the user's password or PIN.

What are needed then, are network-based systems by which a service provider can securely authenticate a user, and at the same time, verify that the web flow is being remotely driven by a human.

SUMMARY

In accordance with the present invention, systems are provided by which a service provider, e.g., a financial service provider, can simultaneously authenticate a user over a network and verify that the user is human by using Captcha-like challenges which are based on past transactions involving and known by both the user and the service provider.

In one embodiment, a method for authenticating a remote user by a service provider includes providing at least one network and at least one processor, and using the at least one network and processor to receive user identification data from the user, generate and display to the user a Captcha-like challenge based on at least one previous transaction involving and known by the user and the service provider, receive a response to the challenge from the user, and determine whether the user is authentic based on the response.

In another embodiment, a non-transitory machine-readable medium comprises a plurality of machine-readable instructions which, when executed by one or more processors of a server, are adapted to cause the server to perform a method comprising: Receiving user identification data from a user; generating and presenting to the user a visually or audibly distorted challenge based on at least one previous transaction involving and known by both the user and a service provider; receiving a response to the challenge from the user; and, determining whether the user is authentic based on the response.

In another embodiment, an apparatus for authenticating a user by a service provider comprises at least one network, at least one processor, means for receiving user identification data from the user, means for generating and displaying to the user a challenge based on at least one previous transaction involving and known by the user and the service provider, means for receiving a response to the challenge from the user, and means for determining whether the user is authentic based on the response.

A better understanding of the above and other features and advantages of the novel user authentication systems of the present invention may be obtained from a consideration of the detailed description of some example embodiments thereof presented below, particularly if such consideration is made in conjunction with the several views of the appended drawings, wherein like elements are referred to by like reference numerals throughout.

BRIEF DESCRIPTION OF THE FIGURES OF THE DRAWINGS

FIG. 1 is an example embodiment of a Captcha in accordance with the prior art, as displayed on a computer display;

FIG. 2 is another example embodiment of a Captcha in accordance with the prior art, as displayed on a computer display;

FIG. 3 is an example embodiment of a Captcha in accordance with the present invention, as displayed on a computer display;

DETAILED DESCRIPTION

Figure 4:
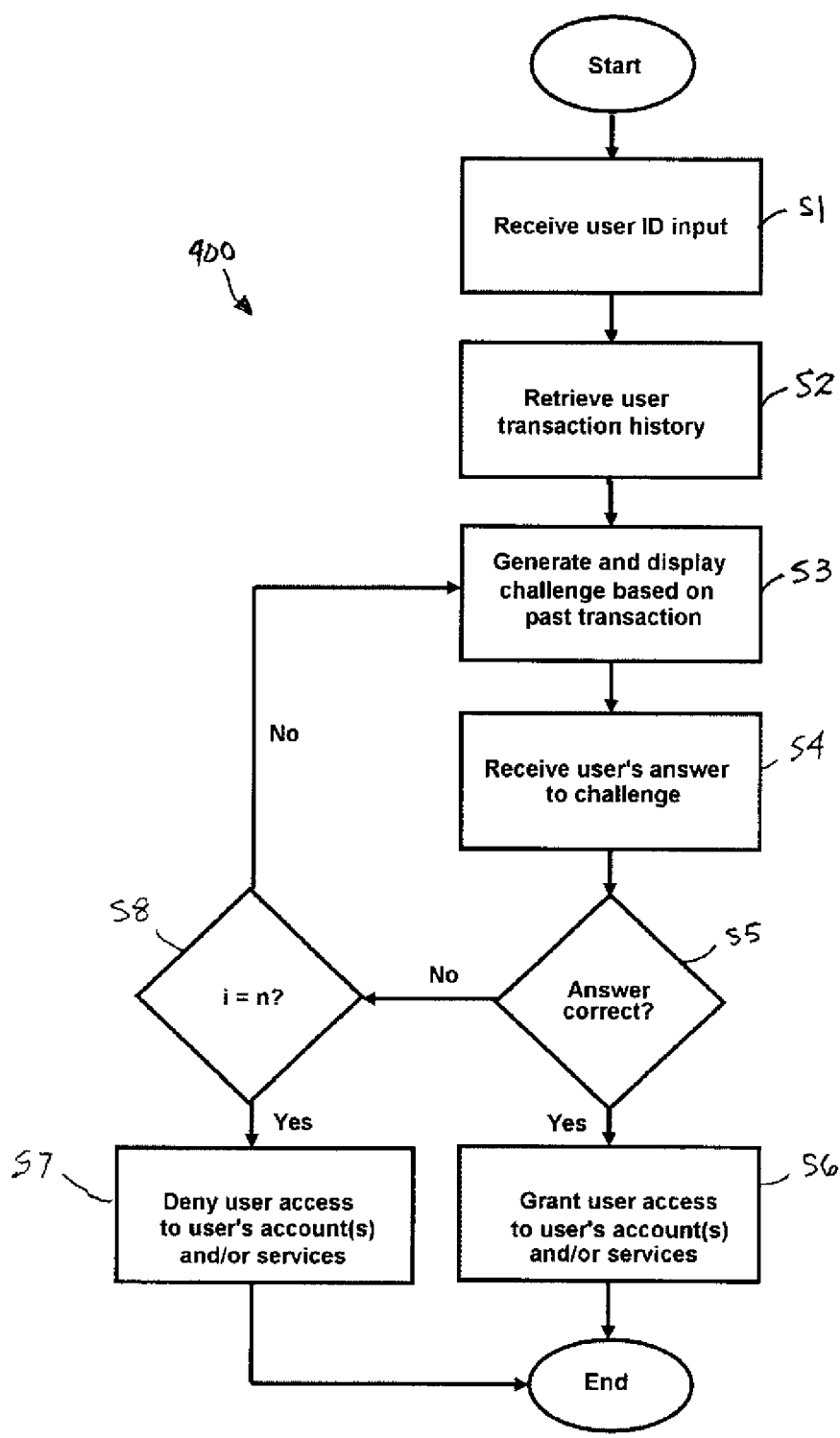
FIG. 4 is a process flow diagram of an example embodiment of a method by which a service provider can authenticate a remote user over a network using Captcha-like challenges based on past transactions involving both the user and the service provider; and, FIG. 5 is a functional block diagram of an example embodiment of an apparatus by which a service provider can authenticate a remote user over a network using Captcha-like challenges based on past transactions involving both the user and the service provider.

FIG. 1 is an example embodiment of a conventional Captcha or "challenge" 100 of a type used by the USPTO to restrict automated, non-human access to its public PAIR web site as it appears on a user's computer display. As may be seen in FIG. 1, the word "yesterday" and the contrived word "graped" 102 are presented in a distorted fashion, with closely crowded letters, and overlaid with color reversing graphics, such that they are discernable by a human user, but difficult to discern by a computer running automated software. To gain access to the site, the user is required to type the two words in the response, or "Answer," window 104, then select the "continue" radio button 106. If the user inputs the two words correctly, then the user is granted access to the site, and if not, the service provider may assume that the user is not human, and may deny access to the site and the services provided thereby.

The Captcha 100 may further include a number of user selectable function icons 108, 110 and 112. These include a "reload" icon that functions to present the user with an alternative word pair challenge 102 to type in, an "audio" icon 110 that functions to present a visually impaired user with an alternate set of challenge words 102 that are audible to the user through speakers or headphones connected to the user's computer, and a "help" icon 112 that functions to present the user with detailed information on how to use the Captcha.

FIG. 2 illustrates another example embodiment of a conventional Captcha 200 of a type offered by Solve Media (http://www.solvemedia.com/) that has a dual function, viz., ensuring that the user is a human, as above, as well as presenting the user with an advertising message 102 to type in. The latter is purported to be superior to conventional advertising messages, e.g., "banner ads," because the user is allegedly more likely to remember the message if obliged to "write it down," i.e., by typing it on the answer line 104.

FIG. 3 illustrates an example embodiment of a Captcha 300 in accordance with the present invention, as displayed on a user's computer display. Like the Captcha 200 of FIG. 2, the Captcha 300 also serves a dual purpose, viz., ensuring that the user is a human, as above, and also of "authenticating" the user to the service provider, i.e., verifying that the identity of the user is in fact that of a preauthorized user, i.e., a registered client or customer of the service provider. However, since conventional Captchas are relatively easy to solve by humans, the challenge 302 of the Captcha 300 in FIG. 3 differs from those of conventional Captchas in that, not only does it present the challenge 302 in a distorted manner, it also elicits specific information relating to a previous transaction that involved and is known by both the user and the service provider.

In the particular example Captcha 300 of FIG. 3, the challenge 302 is one that might be presented to the user by, for example, an online financial service provider, e.g., a bank, such as ING Direct, or a payment/collection service, e.g., PayPal, and comprises a question, in distorted text, regarding the specific amount of a specific recent online purchase made by the (at this point, purported) user through the agency of the service provider. If the user types in the correct response, i.e., the correct amount of the purchase, on the answer line 104, this both reliably authenticates the user to the service provider and verifies that the user is a human and not a computer running automated software, whereupon, the service provider may safely grant the user access to the user's accounts at, and/or the financial services of, the service provider.

It should be noted that the nature of the past transaction queries of the Captchas 300 need not necessarily be just monetary in nature. For example, in some embodiments, the Captcha 300 can take the form of, "Before your last purchase of shoes, what did you purchase with PayPal?" or the like.

In other embodiments, a user "customization/preferences" setting can be used to "bias" the Captchas 300 toward, e.g., specific types of items, colors of items, specific vendor names, or the like, or alternatively, combinations of the foregoing.

Additionally, based on user and/or service provider settings, the Captcha 300 could comprise a collage of iconic (i.e., visual) representations of past purchases with a textual challenge such as, "Of the above items, what did you purchase in Austin at the Domain?" That is to say, the challenge of the Captcha 300 could just as easily have a visual component based on transaction history as well as a textual component.

FIG. 4 is a process flow diagram of an example embodiment of a method 400 by which a service provider can authenticate a user over at least one network using at least one processor and Captcha-like challenges based on past transactions involving and known by both the user and the service provider. As illustrated in FIG. 4, the method 400 begins at step 1 (S1) with the receipt by the service provider of user identification data, which, as discussed above, may comprise simply a user name and/or number, input from a remote entity purporting to be a bona fide, human user of the service provider. The user may transmit the ID data to the service provider in any number of ways, including through the service provider's website from the user's PC, mobile device, tablet device, or the like. The ID can be manually entered by the user or conveyed automatically with the transmission, such as by way of one or more "cookies" from the user PC or device ID from the user's mobile device. The user ID may also be transmitted via voice (e.g., IVR), text (e.g., SMS), or by other means.

In some embodiments, at S2, upon receipt of the user identification data, the service provider may retrieve transaction history data of the user with the service provider from, e.g., a user account database, and at S3, may generate, transmit and present to the user a distorted visual or audible challenge based on at least one previous transaction involving and known by both the user and the service provider. The at least one previous transaction may be one exclusively between the user and the service provider, such as the amount of a recent deposit to a particular account, or may involve a third party, such as an online vendor of products or services, and the challenge may take the form of the challenge 302 of the Captcha 300 discussed above in connection with FIG. 3. The distorted challenge may be visual, like the Captcha of FIG. 1. The distorted challenge may also be audible or a combination of visual and audible, with the purpose of distinguishing between a machine and a human.

At S4, the service provider receives the purported user's response or answer to the challenge of the Captcha, and at S5, determines whether the answer is correct, and based thereon, determines whether the purported user is both authentic and human. The user's response may again take different forms and be transmitted via different devices, such as discussed above with respect to step S1. If the user's response to the challenge is correct, then at S6, the service provider may grant the user access to the user's account(s) at, and/or the services of, the service provider.

The process 400 may also be used for other purposes, such as retrieving a lost or forgotten password. Determination of whether the received response is correct may depend on the question being asked. For example, if the user is asked to provide the date of the user's most recent transaction with the service provider or the amount of the most recent purchase, the service provider may deem a response to be correct even if not exactly correct. In this example, if the actual amount was $145.23, and the user responded with $145.22, this may be deemed "close enough" for the service provider to authenticate the user. Similarly, if the user responds with a date that is one day early or late for a transaction that was performed several months ago, that again may be deemed a correct answer. So, the service provider may have different ways of concluding whether a response is "correct" and thereby authenticating the user. Alternatively, if the answer is not correct, then at S7, the service provider may deny the purported user access to the user's account(s) at, and/or the services of, the service provider.

In some embodiments, the service provider may provide the user with more than one opportunity to be authenticated. For example, as illustrated in FIG. 4 at S8, in some embodiments, upon the receipt of an incorrect response or answer to the first challenge, steps S3-S5 of the method 400 may be repeated one or one or more times (i), up to some maximum number deemed allowable (n), each time presenting the user with a new and different challenge based on a past transaction involving both the user and the service provider. Similarly, while the example method 400 shows the possibility of multiple pass/fail challenges, it is also possible to provide a "tolerance" level of multiple challenges to allow for simple mistakes by the user attempting to credential himself. Alternatively, in some embodiments, the challenge may comprise a plurality of questions, which may be displayed and answered either simultaneously or sequentially, and one or more of which must be answered correctly before the user is granted access. In yet another embodiment, the challenge may take the form of one or more multiple-choice questions. In yet other embodiments, the distorted challenge may ask the user to enter sensitive user information, such as a password, date of birth, social security number, or the like.

By using a distorted challenge based on information known by the user and the service provider, the service provider can determine whether the user is both human and authentic with a single response from the user.

Figure 5:
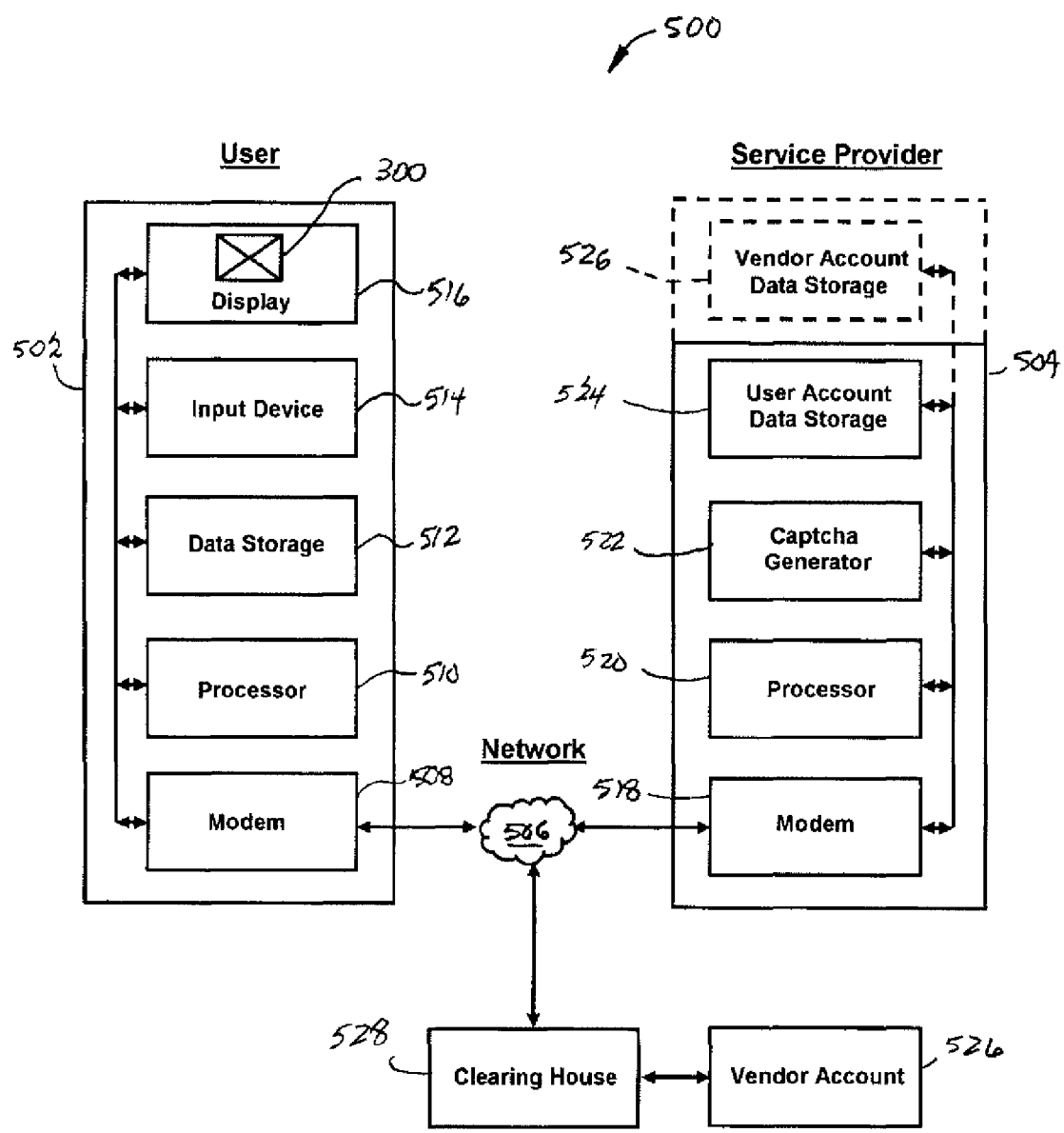

FIG. 5 is a functional block diagram of an example embodiment of an apparatus 500 by which a service provider can authenticate a user over a network using, e.g., the example method 400 discussed above in connection with FIG. 4. As illustrated in FIG. 5, the apparatus 500 may include a user device 502 and a service provider device 504 connectable to each other for bidirectional data communication with each other by at least one data communication network 506.

The user's device 502 may comprise, for example, a personal computer, such as a desktop or laptop computer, a portable tablet computer, a smart phone or a personal digital assistant (PDA), each of a well-known type, and may include a modem 508 for connecting the user to the service provider via the network 506, a processor 510, a data storage device 512, such as a hard disk drive or flash memory, an input device 514, such as a key board, a key pad, and/or a microphone (for inputting audible responses), loud speakers or head phones (for hearing audible challenges), and a display 516, such as a liquid crystal display (LCD), for displaying to the user a visual Captcha 300 useful for authenticating the user to the service provider in the manner described above. In some embodiments, the key pad function may be incorporated in the display 516, e.g., such as in a touch-screen display.

As further illustrated in FIG. 5, the service provider device 504 may comprise a data server, and may include a modem 518, a processor 520, an optional dedicated Captcha generator 522 for generating the authenticating Captchas 300 (which may be effected in advance and cached, or contemporaneously with a given user authentication procedure), a user account data storage device 522, and optionally, a vendor account data storage device 526. In some embodiments, the dedicated Captcha generator 522 can be omitted and the Captcha 300 can instead be generated using the processor 520 of the of the service provider's device 504 running suitable Captcha-generating software.

As discussed above in connection with FIG. 4, an example user authentication procedure may begin with the user connecting to a network site, for example, a web page, of the service provider, via the network, which may comprise the internet, using the modem 508 of the user's device 502, which may be effected via a wired connection or wirelessly. At the service provider network site, the user may be invited to input his or her user identification data, e.g., a user name or number. Upon receipt of the user's identification data, the service provider may retrieve transaction history data involving both the user and the service provider from the user account data storage device 524, and using the optional dedicated Captcha generator 522 or the processor 520, generate a user authenticating Captcha 300 based on at least one previous transaction between the user and the service provider, and transmit it to the user's device 502 via the network 506, where it may be presented to the user on the display 516 of the user's device 502.

As above, the user may then input an answer or response to the challenge of the Captcha 300 using the input device 514 of the user's device 502 and return it to the service provider via the network 506 and, if the response received by the service provider is correct, the service provider may then deem the user to be both authentic and human and grant the user access to the user's accounts and/or the services provided by the service provider.

In some embodiments, the service provider may be a financial service provider, e.g., a online payments/collections intermediary, such as PayPal, which may serve, for example, to effect the financial aspects of online purchases from or sales to selected third parties on behalf the user. In some embodiments, the third party may comprise a vendor or purchaser of goods or services, and as illustrated in FIG. 5, where the user and the vendor both have established accounts 524 and 526 with the service provider, the service provider can, for example, effect payments and returns between the accounts of the two parties without further use of the network 506.

Alternatively, where the vendor's account 526 resides at a bank or other financial institution not affiliated with the service provider, the network 506 of the apparatus 500 may comprise an electronic network component, such as the Automated Clearing House (ACH) or the Electronic Payments Network (EPN) and a clearing house 528, that enable the service provider to effect transfers of funds between the user's accounts 524 and the vendor's accounts 526 electronically via the network 506.

Thus, as those of skill in this art will by now appreciate, although Captchas are conventionally used simply to distinguish humans from machines, in accordance with the present invention, they can also be used to credential a given individual from others, in addition to merely determining whether a subject is a human being and not a script running on a remote computer.

Although the methods and apparatus of the present invention have been described and illustrated herein with reference to certain specific example embodiments thereof, it should be understood that a wide variety of modifications and variations may be made to these without departing from the spirit and scope of the invention, as defined by the claims appended hereafter and their functional equivalents.

What is claimed is:

1. A method for authenticating a user by a service provider, the method comprising:

providing at least one network;
providing at least one processor; and,
using the at least one network and processor to
   receive user identification data from the user,
   generate and present to the user a visually or audibly distorted challenge, request or question based on at least one previous transaction involving and known by both the user and the service provider and based on at least one user-specified preference to a type of content of the at least one previous transaction,
   receive an answer to the challenge, request or question from the user, and
   determine whether the user is authentic based on the answer.

2. The method of claim 1, further comprising storing and retrieving transaction history of the user at the service provider using the user identification data.

3. The method of claim 1, further comprising determining whether the user is a human based on the answer.

4. The method of claim 1, wherein the challenge is generated and displayed in the form of a Captcha.

5. The method of claim 1, further comprising granting the user access to a user's account based on the answer.

6. The method of claim 1, wherein the at least one network comprises the internet, the Automated Clearing House (ACH) or the Electronic Payments Network (EPN).

7. The method of claim 1, wherein the service provider comprises a financial service provider.

8. The method of claim 7, further comprising effecting a financial transaction with a third party on behalf of the user using the at least one network and processor.

9. The method of claim 1, wherein the user identification data comprises a name or a number.

10. The method of claim 1, wherein the at least one transaction is exclusively between the user and the service provider or involves at least one third party.

11. The method of claim 1, wherein the type of content comprises one or more of a category of goods of a previous purchase, a color of goods of a previous purchase and/or the name of a vendor of goods of a previous purchase.

12. The method of claim 1, wherein the presenting comprises presenting the user with a plurality of images associated with the challenge, request or question, and wherein the challenge, request, or question requests the user to select one of the plurality of images.

13. A non-transitory machine-readable medium comprising a plurality of machine-readable instructions which when executed by one or more processors of a server are adapted to cause the server to perform a method comprising:
   receiving user identification data from a user;
   generating and presenting to the user a visually or audibly distorted challenge, request or question based on at least one previous transaction involving and known by both the user and a service provider and based on at least one user-specified preference to a type of content of the at least one previous transaction;
   receiving an answer to the challenge, request or question from the user; and,
   determining whether the user is authentic based on the answer.

14. The medium of claim 13, wherein the method further comprises retrieving a lost or forgotten password and transmitting it to the user.

15. The medium of claim 13, wherein the user identification data is manually entered by the user via a user device or is automatically conveyed to the service provider via a user device.

16. The medium of claim 13, wherein the answer comprises text data, voice data or both text data and voice data.

17. The medium of claim 13, wherein the type of content comprises one or more of a category of goods of a previous purchase, a color of goods of a previous purchase and/or the name of a vendor of goods of a previous purchase.

18. The medium of claim 13, wherein the presenting comprises presenting the user with a plurality of images associated with the challenge, request or question, and wherein the challenge, request, or question requests the user to select one of the plurality of images.

19. An apparatus for authenticating a user by a service provider, the apparatus comprising:
   at least one network;
   at least one processor;
   means for receiving user identification data from the user;
   means for generating and presenting to the user a visually or audibly distorted challenge, request or question based on at least one previous transaction involving and known by both the user and the service provider and based on at least one user-specified preference to a type of content of the at least one previous transaction;
   means for receiving an answer to the challenge, request or question from the user; and,
   means for determining whether the user is authentic based on the answer.

20. The apparatus of claim 19, further comprising means for storing and retrieving transaction history of the user at the service provider using the user identification data.

21. The apparatus of claim 19, wherein the at least one processor comprises a data server, a personal computer, a tablet computer, a smart phone or a personal digital assistant.

22. The apparatus of claim 21, wherein the service provider is a financial service provider and further comprising means for selectably connecting the user to the service provider and for effecting financial transactions between the user and the service provider via the connection and the at least one network.

23. The apparatus of claim 22, further comprising means for effecting a financial transaction with a third party on behalf of the user over the at least one network.

24. The apparatus of claim 23, wherein the at least one network comprises the internet, the Automated Clearing House (ACH) or the Electronic Payments Network (EPN).

25. The apparatus of claim 19, wherein the type of content comprises one or more of a category of goods of a previous purchase, a color of goods of a previous purchase and/or the name of a vendor of goods of a previous purchase.

26. The apparatus of claim 19, wherein the presenting comprises presenting the user with a plurality of images associated with the challenge, request or question, and wherein the challenge, request, or question requests the user to select one of the plurality of images.

* * * * *